US008301726B2

(12) United States Patent
Wang

(10) Patent No.: US 8,301,726 B2
(45) Date of Patent: Oct. 30, 2012

(54) METHOD AND SYSTEM FOR BIT STREAMING FOR DATA CENTRIC APPLICATIONS

(75) Inventor: Steve Wang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 811 days.

(21) Appl. No.: 11/962,144

(22) Filed: Dec. 21, 2007
(Under 37 CFR 1.47)

(65) Prior Publication Data

US 2009/0164515 A1     Jun. 25, 2009

(51) Int. Cl.
*G06F 15/16* (2006.01)

(52) U.S. Cl. ......... 709/218; 709/223; 709/246; 707/602

(58) Field of Classification Search .................. 709/223, 709/231, 246, 218; 707/602
See application file for complete search history.

(56) References Cited

U.S. PATENT DOCUMENTS

| | | | |
|---|---|---|---|
| 6,671,853 B1 | 12/2003 | Burkett et al. | |
| 7,072,914 B2 | 7/2006 | Cabrera et al. | |
| 7,200,848 B1 | 4/2007 | Slaughter et al. | |
| 7,207,002 B2 | 4/2007 | Mireku | |
| 7,840,614 B2 * | 11/2010 | Owen et al. | 707/821 |
| 2002/0103818 A1 * | 8/2002 | Amberden | 707/205 |
| 2003/0055820 A1 * | 3/2003 | Aigen | 707/4 |
| 2005/0198352 A1 | 9/2005 | Fleck et al. | |
| 2005/0289175 A1 * | 12/2005 | Krishnaprasad et al. | 707/102 |
| 2006/0004802 A1 | 1/2006 | Phillips et al. | |
| 2006/0004851 A1 | 1/2006 | Gold et al. | |
| 2006/0064667 A1 * | 3/2006 | Freitas | 717/104 |
| 2006/0123039 A1 | 6/2006 | Scheuerle, Jr. et al. | |
| 2006/0159366 A1 * | 7/2006 | Darwish | 382/276 |
| 2007/0061779 A1 | 3/2007 | Dowedeit et al. | |
| 2007/0073760 A1 | 3/2007 | Baikov | |
| 2007/0100830 A1 * | 5/2007 | Beedubail et al. | 707/9 |
| 2007/0124326 A1 * | 5/2007 | Polk | 707/102 |
| 2008/0082974 A1 * | 4/2008 | Ellison | 717/170 |
| 2009/0055809 A1 * | 2/2009 | Campbell | 717/140 |

OTHER PUBLICATIONS

Payrits, S. et al, "Metadata-Based XML Serialization for Embedded C++", Web Services, 2006. ICWS '06. International Conference on Digital Object Identifier: 10.1109/ICWS.2006.91, Publication Year: 2006, pp. 347-356.*
IBM, "Method and Apparatus for Java Content Repository (JCR) Migration Framework", pp. 1-2, Feb. 21, 2006, http://www.priorartdatabase.com/IPCOM/000133999.

* cited by examiner

*Primary Examiner* — Oanh Duong
(74) *Attorney, Agent, or Firm* — Ayla A. Lari; Hoffman Warnick LLC

(57) ABSTRACT

The present invention utilizes the main Java package (javax.jcr.binary) for saving the node property path and other relevant retrieving information within the serialized XML node files so that the intended large binary data remains inside the content repository while the corresponding node is being serialized. A data centric application which requires processing of the serialized XML node file can then deal with a much reduced sized XML file. This can improve the performance greatly in terms of memory usage and processing speed for XML processors such as DOM. During the consuming phase of the data centric applications, the binary data property is streamed from its source JCR repository into the target repository by looking up its original property path and other retrieving information.

18 Claims, 4 Drawing Sheets

METHOD AND SYSTEM FOR BIT STREAMING FOR DATA CENTRIC APPLICATIONS

BACKGROUND OF THE INVENTION

1. Field of the Invention

The present invention generally relates to data centric applications. Specifically, the present invention provides a system and method for bit streaming in data centric applications.

2. Related Art

The JCR (Java Content Repository, JSR 170: http://jcp.org/en/jsr/detail?id=170) is gaining momentum in the Web based content management system (CMS). A JCR is a Content Repository API for Java (JCR) and is a specification for a Java platform API for accessing content repositories in a uniform manner. The content repositories are used in content management systems (CMS) to keep the content data and also the meta-data used in CMS such as versioning meta-data. The specification was developed under the Java Community Process as JSR-170 (Version 1) and as JSR-283 (Version 2). The main Java package is javax.jcr. Applications based on the JCR are easily customizable with JCR node types for modeling, and are encapsulated of diversified back-end database systems by the higher level JCR API.

All of the data stored in the JCR are represented with XML node schema and can be serialized to the file system. The Extensible Markup Language (XML) is a general-purpose markup language. http://en.wikipedia.org/wiki/Xml-_note-0 It is classified as an extensible language because it allows its users to define their own tags. Its primary purpose is to facilitate the sharing of structured data across different information systems, particularly via the Internet. It is used both to encode documents and serialize data. In the latter context, it is comparable with other text-based serialization languages such as JSON and YAML. (JSON (JavaScript Object Notation) is a lightweight computer data interchange format. It is a text-based, human-readable format for representing simple data structures and associative arrays (called objects). The serialized node file contains the data properties and their path information. More information may be found at json.org. YAML ("YAML Ain't Markup Language") is a human-readable data serialization format that takes concepts from languages such as XML, C, Python, Perl, as well as the format for electronic mail as specified by RFC 2822. More information may be found at YAML.org.) Processing the serialized XML node files with higher performance is critical for enterprise data centric applications such as archive and restore and migration. The XML node files can be large because the JCR can store actual binary content within the XML nodes. It is not uncommon to have tens of megaytes (MB) of JCR XML node files for a typical repository.

There is no efficient XML processor that can handle large XML files with the ability to both parse and manipulate the states of XML elements such as DOM or SAX. One such processor might be good in parsing only (SAX) but not sufficient in maintaining states or vice versa with prohibit memory consumption (DOM). The Document Object Model (DOM) is a platform- and language-independent standard object model for representing HTML or XML and related formats. A web browser is not obliged to use DOM in order to render an HTML document. However, the DOM is required by JavaScript scripts that wish to inspect or modify a web page dynamically. In other words, the Document Object Model is the way JavaScript sees it is containing HTML page and browser state.

The Simple API for XML (SAX) is a serial access parser API for XML. SAX provides a mechanism for reading data from an XML document. It is a popular alternative to the Document Object Model (DOM).

As there is no efficient XML processor for handling large XML files with the ability to both parse and manipulate the states of XML elements such as DOM or SAX, there is a need for a new technique to improve the performance of JCR binary streaming in data centric applications.

SUMMARY OF THE INVENTION

The present invention intends to provide new technique to improve the performance of JCR binary streaming in data centric applications.

The present invention utilizes the main Java package (javax.jcr.binary) for saving the node property path and other relevant retrieving information within the serialized XML node files so that the intended large binary data remains inside the content repository while the corresponding node is being serialized. A data centric application which requires processing of the serialized XML node file can then deal with a much reduced sized XML file. This can improve the performance greatly in terms of memory usage and processing speed for XML processors such as DOM. During the consuming phase of the data centric applications, the binary data property is streamed from its source JCR repository into the target repository by looking up its original property path and other retrieving information.

BRIEF DESCRIPTION OF THE DRAWINGS

These and other features of this invention will be more readily understood from the following detailed description of the various aspects of the invention taken in conjunction with the accompanying drawings in which.

Figure 1:
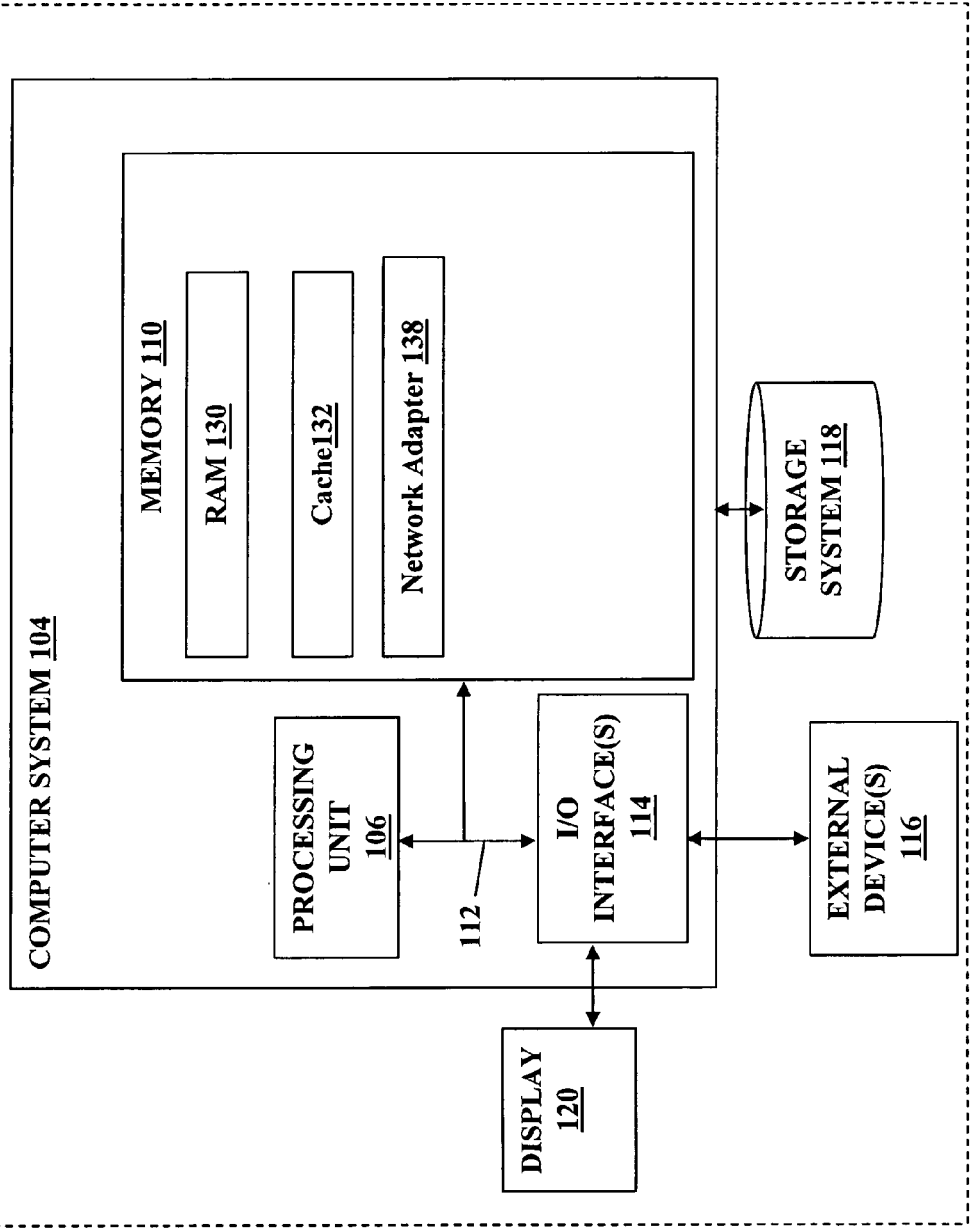
FIG. 1 shows a system suitable for storing and/or executing program code, such as the program code of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE PREFERRED EMBODIMENT

The present invention provides a system and a method for a higher performance processing of serialized XML node files. Higher performance processing of serialized XML node files is critical for enterprise data centric applications such as archive and restore and migration.

The present invention provides a system and method for JCR binary streaming for a data centric application called JCR Migration Framework (JMF) for an IBM WebSphere® Portal environment. (More information about IBM Websphere Portal environment can be found here. http://www.ibm.com/us/.) The migration between two JCR repositories migrate user data saved in the source application model to user data of a target application model which is based on JCR. The migration exports to XML node files on a file system, transforms and imports to a target system.

A data processing system, such as that system 100 shown in FIG. 1, suitable for storing and/or executing program code, such as the program code of the present invention, will include at least one processor (processing unit 106) coupled directly or indirectly to memory elements through a system bus. The memory elements can include local memory (RAM 130) employed during actual execution of the program code, bulk storage (storage 118), and cache memories (cache 132) which provide temporary storage of at least some program code in order to reduce the number of times code must be retrieved from bulk storage during execution. Input/output or I/O devices (external devices 116) (including but not limited to keyboards, displays, pointing devices, etc.) can be coupled to the system either directly or through intervening I/O controllers (I/O Interface 114).

Figure 2:
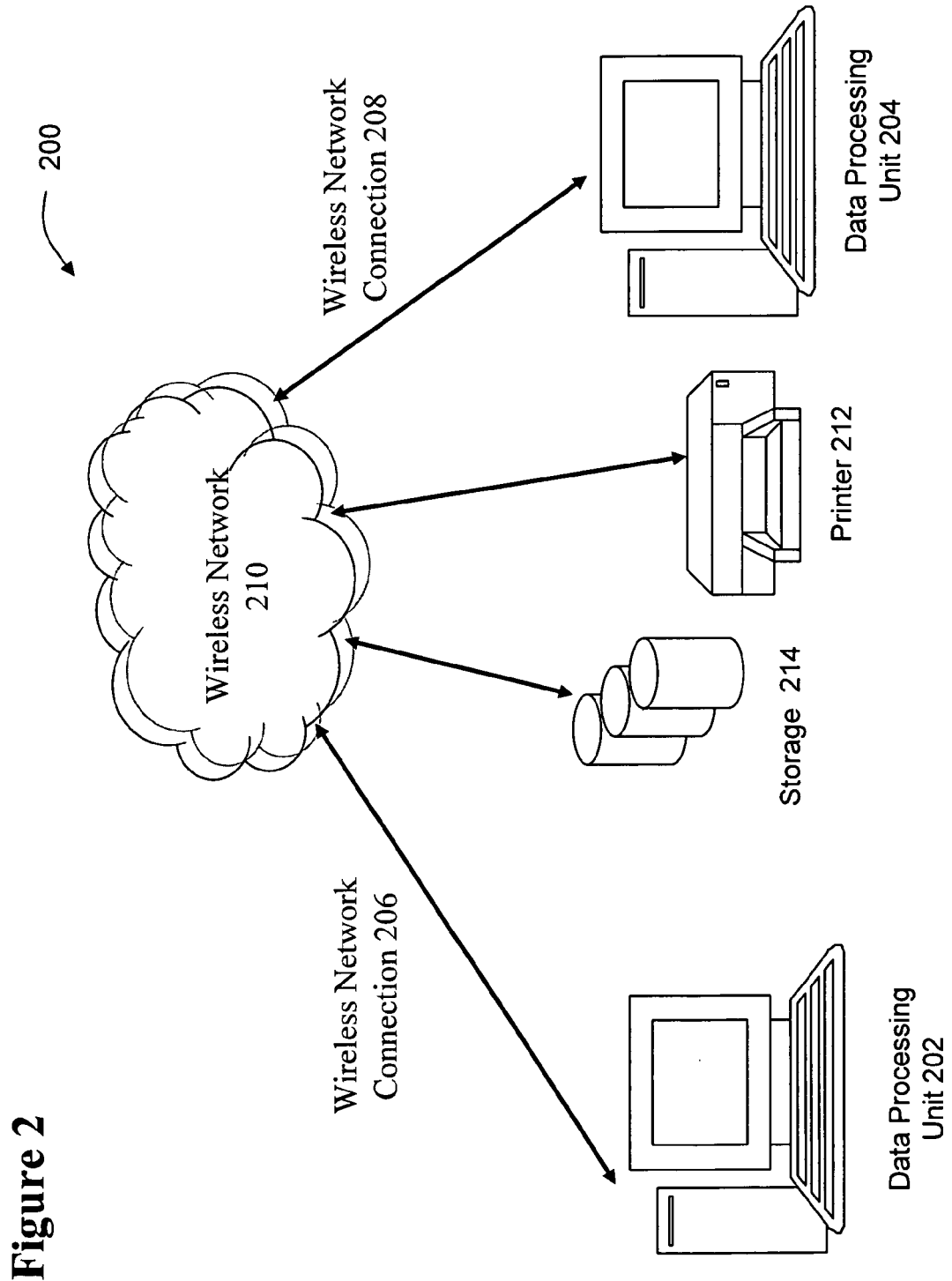
FIG. 2 shows an illustrative communication network for implementing the method of the present invention.

Network adapters (network adapter 138) may also be coupled to the system to enable the data processing system (as shown in FIG. 2, data processing unit 102) to become coupled to other data processing systems (data processing unit 204) or remote printers (printer 212) or storage devices (storage 214) through intervening private or public networks (network 210). (A computer network is composed of multiple computers connected together using a telecommunication system for the purpose of sharing data, resources and communication. For more information, see http://historyoftheinternet.org/). Modems, cable modem and Ethernet cards are just a few of the currently available types of network adapters. (A network card, network adapter or NIC (network interface card) is a piece of computer hardware designed to allow computers to communicate over a computer network. It is both an OSI layer 1 (physical layer) and layer 2 (data link layer) device, as it provides physical access to a networking medium and provides a low-level addressing system through the use of MAC addresses. It allows users to connect to each other either by using cables or wirelessly.)

Figure 3:
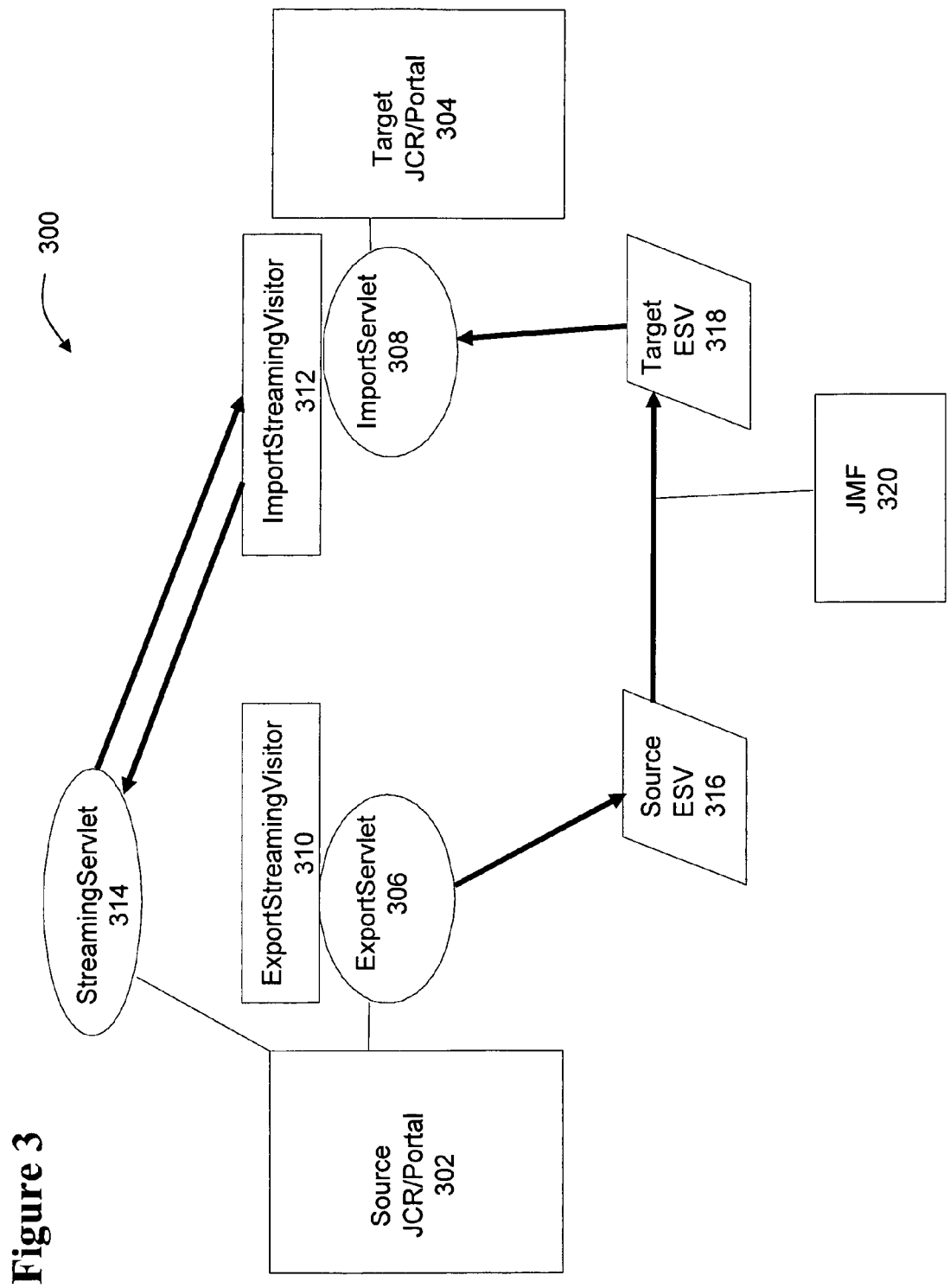
FIG. 3 shows a block diagram of one embodiment of the system and method of the present invention.

FIG. 3 illustrates the system 300 and associated method of the present invention. Source JCR/Portal 302 is the source JCR repository in a WebSphere Portal environment. Target JCR/Portal 304 is the target JCR repository in a WebSphere Portal environment. Data in the Source JCR/Portal 302 is migrated to the Target JCR/Portal 304 according to the system and method of the present invention. ExportServlet 306, connected to the source JCR repository 302, is the servlet for handling exporting of nodes from the source JCR repository 302. (A servlet is a small Java program that runs within a server. Servlets receive and respond to requests from clients.) ImportServlet 308, connected to the target JCR repository 304, is the servlet for handling the importing of nodes to a target JCR repository 304. ExportStreamingVisitor 310, connected to the ExportServlet 306, is a visitor that writes the binary property information with a unique identifier, property path information and other relevant information such as source server information to the nodes to be exported. ImportStreamingVisitor 312 is a visitor that identifies the binary property information, property path information and other relevant information and calls the StreamingServlet 314 to stream the binary property information, property path information and other relevant information from source JCR 302. StreamingServlet 314, connected to the Source JCR/Portal 302 and to the ImportStreamingVisitor 312, is a servlet to handle the streaming of a binary property request and to stream out the actual binary property data to the requester. Source ESV 316, connected to the ExportServlet 306 and Target ESV 318, is the exported system view of the source JCR repository 302 with XML node files. Target ESV 318, connected to the ImportServlet 308 and Source ESV 316, is the exported system view of the transformed XML node files. JMF 320, connected between the Source ESV 316 and the Target ESV 318, is the JCR Migration Framework 320 that transforms the source nodes to the target nodes according to certain transform rules.

The binary streaming of the JCR properties allows migration to export less data, parse efficiently with much reduced sized XML node files during transform for those nodes that contain large binary data, and streaming from the source JCR repository for faster import.

Figure 4:
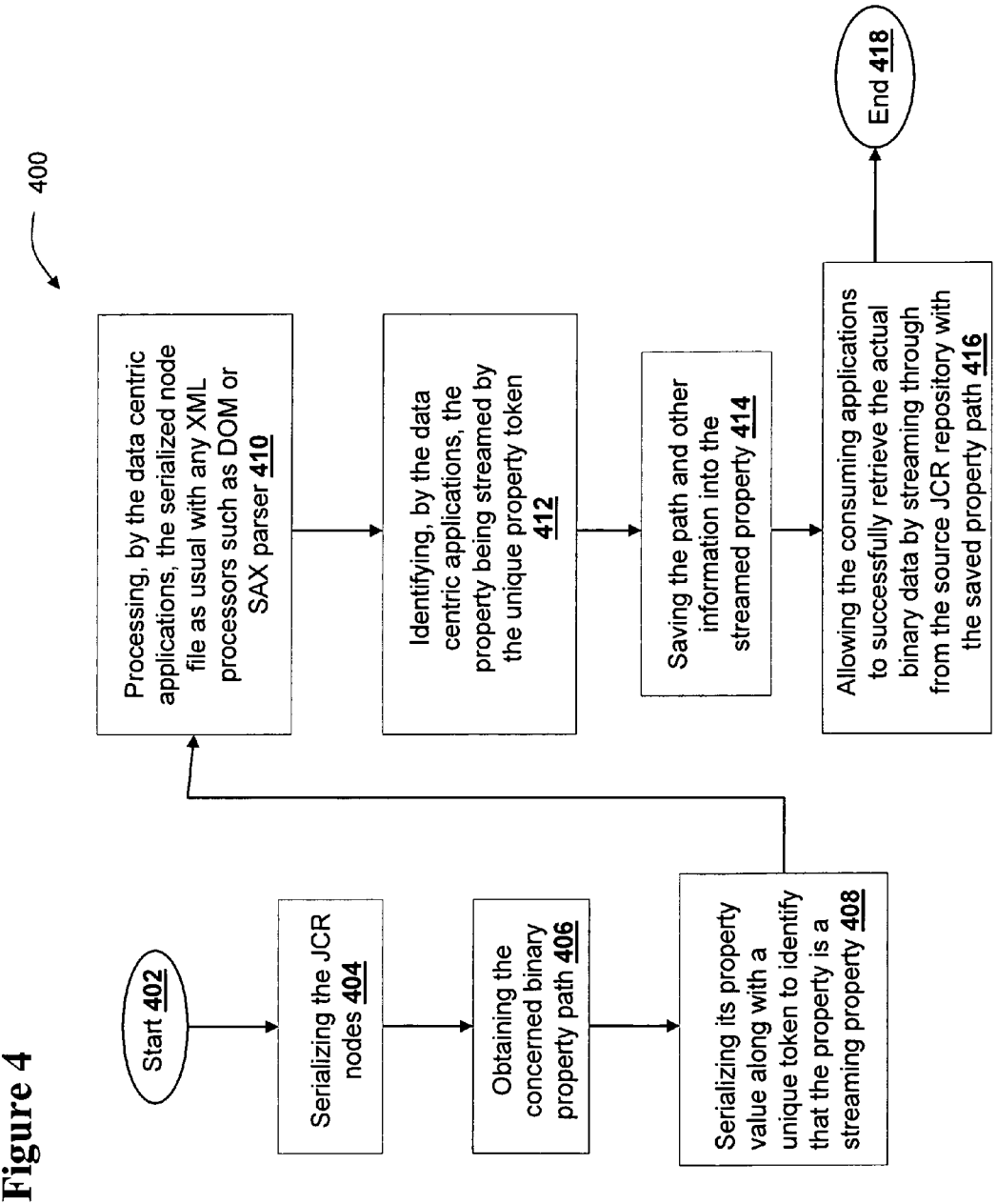
FIG. 4 shows a block diagram of one embodiment of the method of the present invention.

As shown in FIG. 4, the method 400 of JCR binary streaming involves two phases which starts at 402. The first phase is when the JCR nodes are serialized at 404. The concerned binary property path is obtained at 406 and serialized into its property value along with a unique token to identify that this property is a streaming property at 408. Other relevant retrieving information such as source server information is also serialized. The data centric applications can process the serialized node file as usual with any XML processors such as DOM or SAX parser at 410. The second phase happens during consuming or import. The data centric applications will identify the property being streamed by the unique property token at 412. The path and other information saved in the streamed property information at 414 allowing the consuming applications to successfully retrieve the actual binary data by streaming through the source JCR repository with the saved property path information at 416 and ends at 418.

It should be understood that the present invention is typically computer-implemented via hardware and/or software. As such, client systems and/or servers will include computerized components as known in the art. Such components typically include (among others) a processing unit, a memory, a bus, input/output (I/O) interfaces, external devices, etc.

While shown and described herein as a system and method for easily bit streaming for data centric applications, it is understood that the invention further provides various alternative embodiments. For example, in one embodiment, the invention provides a computer-readable/useable medium that includes computer program code to enable a computer infrastructure to easily bit stream for data centric applications. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.), and/or as a data signal (e.g., a propagated signal) traveling over a network (e.g., during a wired/wireless electronic distribution of the program code).

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A data transfer method comprising:
    transferring data from a source Java Content Repository (JCR) to a target system, the transferring including serializing a source extensible markup language (XML) node schema including a plurality of nodes for the source JCR into a plurality of XML node files in a file system, each of the plurality of XML node files comprising a text file, at least one of the plurality of nodes comprising a binary node including binary data stored in the source JCR, the serializing including:
        for each of the at least one of the plurality of nodes comprising a binary node including binary data stored in the source JCR, serializing an identifier indicating to the target system the node corresponds to a streaming property and a path enabling access by the target system to the binary data in the source JCR into a corresponding XML node file in the file system without serializing the binary data, wherein the binary data remains in the source JCR and remains external from all of the plurality of XML node files corresponding to the source JCR.

2. The method of claim 1, the serializing further including, for each binary node, serializing source server information for the binary data.

3. The method of claim 1, the transferring further comprising providing the plurality of XML node files for processing by the target system, wherein the target system comprises a data centric application.

4. The method of claim 3, wherein the data centric application comprises at least one of: a target JCR, an archive and restore application, or a migration application.

5. The method of claim 3, the transferring further comprising:
    receiving a request to stream the binary data for a binary node in an XML node file from the data centric application subsequent to the providing; and
    streaming the binary data corresponding to the binary node from the source JCR for processing by the data centric application in response to the receiving.

6. The method of claim 5, wherein the data centric application comprises a target JCR, the method further comprising transforming the plurality of XML node files from a source application model to a target application model using the target JCR and a set of transform rules.

7. A system comprising:
    a computer system including at least one computing device, the computer system for performing a data transfer method, the method comprising:
    transferring data from a source Java Content Repository (JCR) to a target system, the transferring including serializing a source extensible markup language (XML) node schema including a plurality of nodes for the source into a plurality of XML node files in a file system, each of the plurality of XML node files comprising a text file, at least one of the plurality of nodes comprising a binary node including binary data stored in the source JCR, the serializing including:
        for each of the at least one of the plurality of nodes comprising a binary node including binary data stored in the source JCR, serializing an identifier indicating to the target system the node corresponds to a streaming property and a path enabling access by the target system to the binary data in the source JCR into a corresponding XML node file in the file system without serializing the binary data, wherein the binary data remains in the source JCR and remains external from all of the plurality of XML node files corresponding to the source JCR.

8. The system of claim 7, the serializing further including, for each binary node, serializing source server information for the binary data.

9. The system of claim 7, the transferring further comprising providing the XML node file for processing by a data centric application.

10. The system of claim 9, wherein the data centric application comprises at least one of: a target JCR, an archive and restore application, or a migration application.

11. The system of claim 9, the transferring further comprising:
    receiving a request to stream the binary data for a binary node in an XML node file from the data centric application subsequent to the providing; and
    streaming the binary data corresponding to the binary node from the source JCR for processing by the data centric application in response to the receiving.

12. The system of claim 11, wherein the data centric application comprises a target JCR, the method further comprising transforming the plurality of XML node files from a source application model to a target application model using the target JCR and a set of transform rules.

13. A program product stored on a computer readable device, the program product including program code for enabling a computer system to perform a data transfer method, the data transfer method comprising:
    transferring data from a source Java Content Repository (JCR) to a target system, the transferring including serializing a source extensible markup language (XML) node schema including a plurality of nodes for the source JCR into a plurality of XML node files in a file system without serializing the binary data, each of the plurality of XML node files comprising a text file, at least one of the plurality of nodes comprising a binary node including binary data stored in the source JCR, the serializing including:
        for each of the at least one of the plurality of nodes comprising a binary node including binary data stored in the source JCR, serializing an identifier indicating to the target system the node corresponds to a streaming property and a path enabling access by the target system to the binary data in the source JCR into a corresponding XML node file in the file system, wherein the binary data remains in the source JCR and remains external from all of the plurality of XML node files corresponding to the source JCR.

14. The program product of claim 13, the serializing further including, for each binary node, serializing source server information for the binary data.

15. The program product of claim 13, the transferring further comprising providing the XML node file for processing by a data centric application.

16. The program product of claim 15, wherein the data centric application comprises at least one of: a target JCR, an archive and restore application, or a migration application.

17. The program product of claim 15, the transferring further comprising:
  receiving a request to stream the binary data for a binary node in an XML node file from the data centric application subsequent to the providing; and
  streaming the binary data corresponding to the binary node from the source JCR for processing by the data centric application in response to the receiving.

18. The program product of claim 17, wherein the data centric application comprises a target JCR, the method further comprising transforming the plurality of XML node files from a source application model to a target application model using the target JCR and a set of transform rules.

* * * * *